United States Patent
Perron

(10) Patent No.: US 11,125,648 B2
(45) Date of Patent: Sep. 21, 2021

(54) DUPLICATE OTDR MEASUREMENT DETECTION

(71) Applicant: EXFO Inc., Quebec (CA)

(72) Inventor: Stephane Perron, Quebec (CA)

(73) Assignee: EXFO Inc., Quebec (CA)

(*) Notice: Subject to any disclaimer, the term of this patent is extended or adjusted under 35 U.S.C. 154(b) by 0 days.

(21) Appl. No.: 16/892,767

(22) Filed: Jun. 4, 2020

(65) Prior Publication Data

US 2020/0386653 A1    Dec. 10, 2020

Related U.S. Application Data

(60) Provisional application No. 62/858,357, filed on Jun. 7, 2019.

(51) Int. Cl.
*G01M 11/00* (2006.01)
*H04B 10/071* (2013.01)

(52) U.S. Cl.
CPC .... *G01M 11/3145* (2013.01); *G01M 11/3109* (2013.01); *G01M 11/3136* (2013.01); *G01M 11/3154* (2013.01); *H04B 10/071* (2013.01)

(58) Field of Classification Search
CPC ............. G01M 11/31; G01M 11/3109; G01M 11/3118; G01M 11/3127; G01M 11/3136; G01M 11/3145; G01M 11/3154; G01M 11/3163; G01M 11/3181; G01M 11/319; H04B 10/071

See application file for complete search history.

(56) References Cited

U.S. PATENT DOCUMENTS

| | | | | | |
|---|---|---|---|---|---|
| 5,365,328 | A | * | 11/1994 | Anderson | G01M 11/3109 356/73.1 |
| 5,373,356 | A | * | 12/1994 | Anderson | G01M 11/3145 356/73.1 |
| 5,442,434 | A | * | 8/1995 | Liao | G01M 11/3145 356/73.1 |
| 5,966,207 | A | * | 10/1999 | Haskins | G01M 11/3163 356/73.1 |
| 6,674,518 | B1 | * | 1/2004 | Asher | G01M 11/3109 356/73.1 |

(Continued)

FOREIGN PATENT DOCUMENTS

| | | |
|---|---|---|
| DE | 10 2016 124 654 A1 | 6/2018 |
| EP | 2356760 A1 | 8/2011 |

(Continued)

OTHER PUBLICATIONS

Luna, Luna Researchers Harness the Power of Fiber Fingerprints, 2019 [online]. Retrieved from the Internet on Apr. 2, 2019: <URL: https://lunainc.com/fiber-optic-solutions/luna-researchers-harness-the-power-of-fiber-fingerprints/>.

(Continued)

*Primary Examiner* — Gordon J Stock, Jr.
(74) *Attorney, Agent, or Firm* — Helene Chotard

(57) ABSTRACT

There is provided a method, system and computer program for detecting duplicate OTDR measurements performed on a same fiber. It is determined whether OTDR traces are likely to have been acquired over the same optical fiber link by comparing the backscattering pattern associated with a given fiber span along the OTDR traces, which corresponds to a continuous optical fiber section.

25 Claims, 11 Drawing Sheets

(56) References Cited

U.S. PATENT DOCUMENTS

| | | | |
|---|---|---|---|
| 6,710,862 B1* | 3/2004 | Wilson | G01M 11/3145 356/73.1 |
| 7,772,541 B2 | 8/2010 | Froggatt et al. | |
| 7,808,621 B2 | 10/2010 | Russell | |
| 8,482,725 B2 | 7/2013 | Perron et al. | |
| 8,570,501 B2 | 10/2013 | Nagel et al. | |
| 8,576,387 B2 | 11/2013 | Woodward et al. | |
| 9,103,746 B2* | 8/2015 | Kaufhold | H04B 10/071 |
| 9,329,098 B2* | 5/2016 | Sanchez | G01M 11/30 |
| 9,423,316 B2* | 8/2016 | Perron | G01M 11/3145 |
| 9,774,390 B2* | 9/2017 | Zhou | H04B 10/071 |
| 10,014,935 B2* | 7/2018 | Perron | G01M 11/3127 |
| 10,135,531 B1* | 11/2018 | Joffe | H04B 10/60 |
| 10,371,596 B2 | 8/2019 | L'Heureux et al. | |
| 10,784,969 B2* | 9/2020 | Weiner | H04B 10/85 |
| 2015/0124246 A1 | 5/2015 | Collier et al. | |

FOREIGN PATENT DOCUMENTS

| | | |
|---|---|---|
| WO | 2008115375 A1 | 9/2008 |
| WO | 2011153126 A2 | 12/2011 |

OTHER PUBLICATIONS

Gysel et al., Statistical Properties of Rayleigh Backscattering in Single-Mode Fibers, IEEE, Journal of Lightwave Technology, Apr. 1990, vol. 8. No. 4.

Mermelstein et al., Rayleigh scattering optical frequency correlation in a single-mode optical fiber, Optics Letters, Jan. 15, 2001, vol. 26, No. 2, Washington, D.C., United States.

K De Souza, Significance of coherent Rayleigh noise in fibre-optic distributed temperature sensing based on spontaneous Brillouin scattering, DOI: 10.1088/0957-0233/17/5/S21, Institute of Physics Publishing, Measurement Science and Technology, vol. 17, 2006, pp. 1065-1069.

Brodsky et al., Rayleigh backscattering from optical fibers—could it be used to identify individual fibers?, Optical Society of America, 2010.

Naseem et al., Composite Coding Scheme for OTDR SNR Enhancement, 11th International Conference on Telecommunications—ConTEL 2011, Special Session on Optical Access, ISBN: 978-3-85125-161-6, Jun. 15-17, 2011, Graz, Austria.

Palmieri et al., Distributed Optical Fiber Sensing Based on Rayleigh Scattering, The Open Optics Journal, 2013, vol. 7, (Suppl-1, M7) 104-127.

Villafani Caballero et al., Tuneable OTDR Measurements for WDM-PON Monitoring, Conference paper, DOI: 10.1109/IMOC.2013.6646511, Aug. 2013.

Du et al., Unclonable Optical Fiber Identification Based on Rayleigh Backscattering Signatures, IEEE, Journal of Lightwave Technology, DOI 10.1109/JLT.2017.2754285, 2017.

Guemes et al., Fiber Optic Distributed Sensing, STP-EN-AVT-220, retrieved Nov. 5, 2019.

Park et al., Coded optical time domain reflectometry: principle and applications, Proc. of SPIE vol. 6781, 678129, DOI: 10.1117/12.746977, 2007.

* cited by examiner

|    | 1 | 2 | 3 | 4 | 5 | 6 | 7 | 8 | 9 | 10 | 11 | 12 | 13 | 14 | 15 | 16 |
|----|---|---|---|---|---|---|---|---|---|----|----|----|----|----|----|----|
| 1  |   | 0.12 | 0.42 | -0.05 | 0.41 | -0.06 | 0.42 | -0.05 | 0.41 | -0.05 | 0.40 | -0.07 | 0.40 | -0.08 | 0.40 | -0.07 |
| 2  |   |   | -0.11 | 0.08 | -0.12 | 0.08 | -0.12 | 0.06 | -0.12 | 0.05 | -0.11 | 0.03 | -0.13 | 0.03 | -0.13 | -0.02 |
| 3  |   |   |   | -0.04 | 0.97 | -0.06 | 0.96 | -0.05 | 0.95 | -0.05 | 0.92 | -0.08 | 0.91 | -0.08 | 0.90 | -0.10 |
| 4  |   |   |   |   | 0.12 | 0.94 | 0.13 | 0.90 | 0.13 | 0.89 | 0.12 | 0.84 | 0.14 | 0.82 | 0.12 | 0.76 |
| 5  |   |   |   |   |   | -0.05 | 0.97 | -0.05 | 0.97 | -0.06 | 0.94 | -0.09 | 0.93 | -0.09 | 0.92 | -0.08 |
| 6  |   |   |   |   |   |   | -0.08 | 0.94 | -0.09 | 0.92 | -0.09 | 0.87 | -0.10 | 0.86 | -0.11 | 0.75 |
| 7  |   |   |   |   |   |   |   | -0.06 | 0.97 | -0.06 | 0.95 | -0.09 | 0.94 | -0.10 | 0.93 | -0.09 |
| 8  |   |   |   |   |   |   |   |   | 0.03 | 0.94 | 0.03 | 0.89 | 0.04 | 0.88 | 0.03 | 0.75 |
| 9  |   |   |   |   |   |   |   |   |   | -0.05 | 0.97 | -0.08 | 0.95 | -0.08 | 0.94 | -0.07 |
| 10 |   |   |   |   |   |   |   |   |   |    | 0.14 | 0.90 | 0.16 | 0.88 | 0.13 | 0.78 |
| 11 |   |   |   |   |   |   |   |   |   |    |    | -0.09 | 0.96 | -0.10 | 0.95 | -0.09 |
| 12 |   |   |   |   |   |   |   |   |   |    |    |    | 0.05 | 0.93 | 0.04 | 0.80 |
| 13 |   |   |   |   |   |   |   |   |   |    |    |    |    | 0.12 | 0.93 | 0.15 |
| 14 |   |   |   |   |   |   |   |   |   |    |    |    |    |    | -0.17 | 0.82 |
| 15 |   |   |   |   |   |   |   |   |   |    |    |    |    |    |    | -0.08 |
| 16 |   |   |   |   |   |   |   |   |   |    |    |    |    |    |    |    |

Fig. 5

DUPLICATE OTDR MEASUREMENT DETECTION

CROSS-REFERENCE TO RELATED APPLICATIONS

This application claims priority under 35USC§ 119(e) of U.S. provisional patent application(s) 62/858,357 filed Jun. 7, 2019; the specification of which is hereby incorporated by reference.

TECHNICAL FIELD

The present description generally relates to Optical Time-Domain Reflectometry (OTDR), and more particularly to detection of duplicate OTDR measurements.

BACKGROUND

Communication network operators often subcontract installation, repair and testing of their optical fiber network. These tasks can also be accomplished by network operators' employees. Typically, a test job includes the characterization of many optical fibers, which can be part of a same optical fiber cable. A single optical fiber cable may comprise up to hundreds of individual optical fibers. A test report may be prepared by the employee or subcontractor and submitted to the network operator. In the context of installation or repair, the test report may further be required to complete a job and release payment to a subcontractor.

A test job may include, e.g., OTDR measurements carried towards each individual fiber of one or more optical fiber cables.

Testing many fibers can take a long time and connecting to each individual fiber requires manipulation, including cleaning. Furthermore, measurement results that do not comply with the network operator acceptance criteria (e.g. PASS/FAIL thresholds) may involve extra manipulation to repair a noncompliant splice for example. Therefore, in order to save time and money, temptation can be high to cheat by repeating an OTDR measurement on the same fiber and pretend that the test was performed on different fibers.

Cheating employees or subcontractors would look for a compliant fiber (i.e., qualified as good or acceptable) and then remain on this fiber while pretending to connect to the next one before launching a new measurement. Of course, measurements will be repeated on compliant fibers and, consequently, fibers that might have failed the test can go undetected.

Although duplication of test data files can be easily detected by auditing the test report (from metadata), such audition will not detect duplicate measurements over a same fiber but saved in different data files.

Of course, although cheating is more tempting on a large number of fibers to be tested, it can also be present on small numbers and duplicate measurements can also be inadvertent.

There therefore remains a need for detecting inadvertent or fraudulent duplicate OTDR measurements performed on a same fiber.

SUMMARY

There is therefore provided a method, system and computer program for detecting duplicate OTDR measurements performed on a same fiber. Duplicate OTDR measurements may be matched by pair by comparing the acquired OTDR traces and, more specifically, their backscattering patterns. It is determined whether OTDR traces are likely to have been acquired over the same optical fiber link by comparing the backscattering pattern associated with a given fiber span along the OTDR traces, which correspond to a continuous optical fiber section.

The manufacturing process of optical fibers produces small fluctuations in the optical fiber structure along any segment of optical fiber. When such fluctuations interact with the OTDR test pulses, it creates interferences and modulations that produce a backscattering pattern in the acquired OTDR trace. This backscattering pattern can be used to detect duplicate OTDR measurements.

However, characteristics of the OTDR test pulses may also fluctuate in time, including polarization state, wavelength and spectral shape, due, e.g., to temperature variations in the laser source. These characteristics of the OTDR test pulses create variations in the backscattering pattern associated with a given optical fiber segment. Because the structural fluctuations along optical fibers are random, any measured backscattering pattern is unique to given optical fiber segment and OTDR laser source combination.

It was found that it is nonetheless possible to detect duplicate OTDR measurements by finding similar backscattering patterns in OTDR traces that were acquired over a relatively short period of time where characteristics of the OTDR test pulses did not fluctuate so much.

For example, such detection of duplicate OTDR measurements can be used to detect inadvertent or fraudulent repeated testing on a same fiber instead of testing separate optical fibers of an optical fiber cable.

Because of the above-mentioned fluctuations of the OTDR laser source, the backscattering pattern obtained by repeated measurements over a segment of a same optical fiber may slowly drift in time. This effect gives rise to an additional challenge in case of high fiber count: OTDR measurements that are repeated back-to-back give rise to backscattering patterns that are more likely to be similar, whereas if the OTDR measurements are repeated again and again over the same optical fiber, the backscattering pattern similarly drifts such that some repeated OTDR measurements may be more difficult to identify as duplicates. Accordingly, in some embodiments, the OTDR measurements may be grouped in clusters formed by following a daisy chain that links pairs of likely duplicate OTDR measurements. Such a daisy chain may stretch to link all OTDR measurements performed on the same optical fiber, between the first and the last. In use cases wherein more than one fiber was duplicated, this daisy chaining may allow to form a number of clusters of duplicate OTDR measurements that corresponds to the number of different optical fibers that were actually tested.

Accordingly, in one embodiment, the method further comprises a step of building a cluster of OTDR traces that are likely to be have been acquired over the same optical fiber link by: for each new OTDR trace being considered, if the duplicate likelihood between the new OTDR trace and at least one of the OTDR traces that are part of said cluster is greater than a threshold, adding the new OTDR trace to said cluster.

In accordance with one aspect, there is provided a method for detecting duplicate Optical Time-Domain Reflectometric (OTDR) measurements comprising:

receiving a first OTDR trace and a second OTDR trace, respectively identified as being acquired over a first optical fiber link and a second optical fiber link, the second optical fiber link identified as different from said first optical fiber link;

identifying at least one fiber span along the first OTDR trace, which corresponds to a continuous optical fiber section; and comparing the backscattering patterns of said first and second OTDR traces over the identified fiber span to determine if said first and second OTDR traces that are identified as being acquired over different optical fiber links, are likely to have been acquired over the same optical fiber link.

In some embodiments, the method further comprises: activating a flag associated with the OTDR measurements when said first and second OTDR traces that are identified as being acquired over different optical fiber links, are likely to have been acquired over the same optical fiber link.

In some embodiments, the step of comparing the backscattering pattern comprises: calculating a correlation coefficient of the backscattering patterns of said first and said second OTDR traces over the identified fiber span, a value of the correlation coefficient being indicative of a likelihood of said first and said second OTDR traces being acquired over the same optical fiber link. For example, a flag associated with the OTDR measurements may be activated when a value of said correlation coefficient is greater than a threshold.

In some embodiments, the method further comprises: comparing characteristics of said first optical fiber link and said second optical fiber link, said characteristics comprising one or more of: a total length, a total insertion loss and positions of loss and/or reflective events, and wherein if the compared characteristics do not match, determine that said first and second OTDR traces that are identified as being acquired over different optical fiber links, are unlikely to have been acquired over the same optical fiber link.

In some embodiments, the fiber span may be identified by identifying at least one fiber span that is free of loss and reflective events and having a ratio of backscattering pattern amplitude to electronic noise that is greater than a given threshold. For example, by identifying loss and reflective events along the first OTDR trace; defining a plurality of fiber spans between said loss and reflective events; and among said plurality of fiber spans, selecting at least one fiber span having a ratio of backscattering pattern amplitude to electronic noise that is greater than a given threshold.

In some embodiments, more than one fiber spans corresponding to continuous optical fiber sections may be identified, and the backscattering patterns be compared over the more than one fiber spans.

In other embodiments, the fiber span may be identified by:
identifying loss and reflective events along the first OTDR trace;
defining a plurality of fiber spans between said loss and reflective events;
among said plurality of fiber spans, selecting the fiber span having the greatest ratio of backscattering pattern amplitude to electronic noise.

In some embodiments, the method is applied to a set of more than two OTDR measurements. The method may further comprise: calculating a duplicate likelihood for all possible combinations of OTDR measurements and generating a flag associated with the set of OTDR measurements when said duplicate OTDR measurements are detected in at least a given proportion.

In such embodiments, the method may further comprise: building a cluster of OTDR measurements that are likely to be have been acquired over the same optical fiber link by:
for each new OTDR measurement being considered, if duplication is likely between the new OTDR measurement and at least one of the OTDR measurements that are part of said cluster, adding the new OTDR trace to said cluster.

In accordance with another aspect, there is provided a non-transitory computer-readable storage medium comprising instructions that, when executed, cause a processor to perform the steps of:

receiving a first OTDR trace identified as being acquired over a first optical fiber link, and a second OTDR trace identified as being acquired over a second optical fiber link, identified as different from said first optical fiber link;

identifying at least one fiber span along the first OTDR trace, which correspond to a continuous optical fiber section; and comparing the backscattering pattern of said first and second OTDR traces over the identified fiber span to determine if said first and second OTDR traces that are identified as being acquired over different optical fiber links, are likely to have been acquired over the same optical fiber link.

In accordance with another aspect, there is provided a computer program comprising instructions that, when executed by a processor, cause the processor to perform anyone of the methods described herein.

In accordance with yet another aspect, there is provided a system for detecting duplicate Optical Time-Domain Reflectometric (OTDR) measurements comprising:

an OTDR acquisition device connectable toward an end of the optical fiber link for performing one or more OTDR acquisitions toward the optical fiber link, wherein each OTDR acquisition is performed by propagating in the optical fiber link under test, a test signal corresponding to a first pulse width and detecting corresponding return light from the optical fiber link so as to obtain an OTDR trace representing backscattered and reflected light as a function of distance in the optical fiber link;

a processing unit configured for:
receiving a first OTDR trace and a second OTDR trace, respectively identified as being acquired over a first optical fiber link and a second optical fiber link, the second optical fiber link identified as different from said first optical fiber link;

identifying at least one fiber span along the first OTDR trace, which corresponds to a continuous optical fiber section; and comparing the backscattering patterns of said first and second OTDR traces over the identified fiber span to determine if said first and second OTDR traces that are identified as being acquired over different optical fiber links, are likely to have been acquired over the same optical fiber link.

In some embodiments, the system may further comprise a server in which the processing unit is located.

In some embodiments, the processing unit may receive a first OTDR measurement data file and a second OTDR measurement data file produced by the OTDR acquisition device, the first and second OTDR measurement data files respectively associated with a first optical fiber link and a second optical fiber link and respectively comprising a first OTDR trace and a second OTDR trace.

In accordance with yet another aspect, there is provided a method for detecting duplicate Optical Time-Domain Reflectometric (OTDR) measurements comprising:

receiving in a server application, a first OTDR measurement data file and a second OTDR measurement data file acquired by an OTDR acquisition device, the first and second OTDR measurement data files respectively associated with a first optical fiber link and a second optical fiber link and respectively comprising a first OTDR trace and a second OTDR trace, the second optical fiber link being identified as different from said first optical fiber link;

the server application identifying at least one fiber span along the first OTDR trace, which correspond to a continuous optical fiber section;

the server application comparing the backscattering pattern of said first and second OTDR traces over the identified fiber span to determine if said first and second OTDR traces that are identified as being acquired over different optical fiber links, are likely to have been acquired over the same optical fiber link.

when said first and second OTDR traces that are identified as being acquired over different optical fiber links, are determined to be likely to have been acquired over the same optical fiber link, the server application activating a flag.

In this specification, the expression "duplicate OTDR measurement" is intended to refer to OTDR measurements repeated over a same optical fiber link. In the context of this specification, although the proposed method can also detect test data or test data files that are being copied or duplicated, it can further detect when OTDR measurements are repeated and saved in different test data files. The content of the test data or test data file is different because the OTDR measurement is repeated using the same or different test parameters.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context of its intended application.

BRIEF DESCRIPTION OF THE DRAWINGS

Further features and exemplary advantages of the present invention will become apparent to the skilled person from the following detailed description, taken in conjunction with the appended drawings, in which:

FIG. 5 is a table listing correlation coefficients derived from OTDR measurements indicated as being performed over a set of 16 different optical fibers;

It will be noted that throughout the drawings, like features are identified by like reference numerals.

Figure 1:
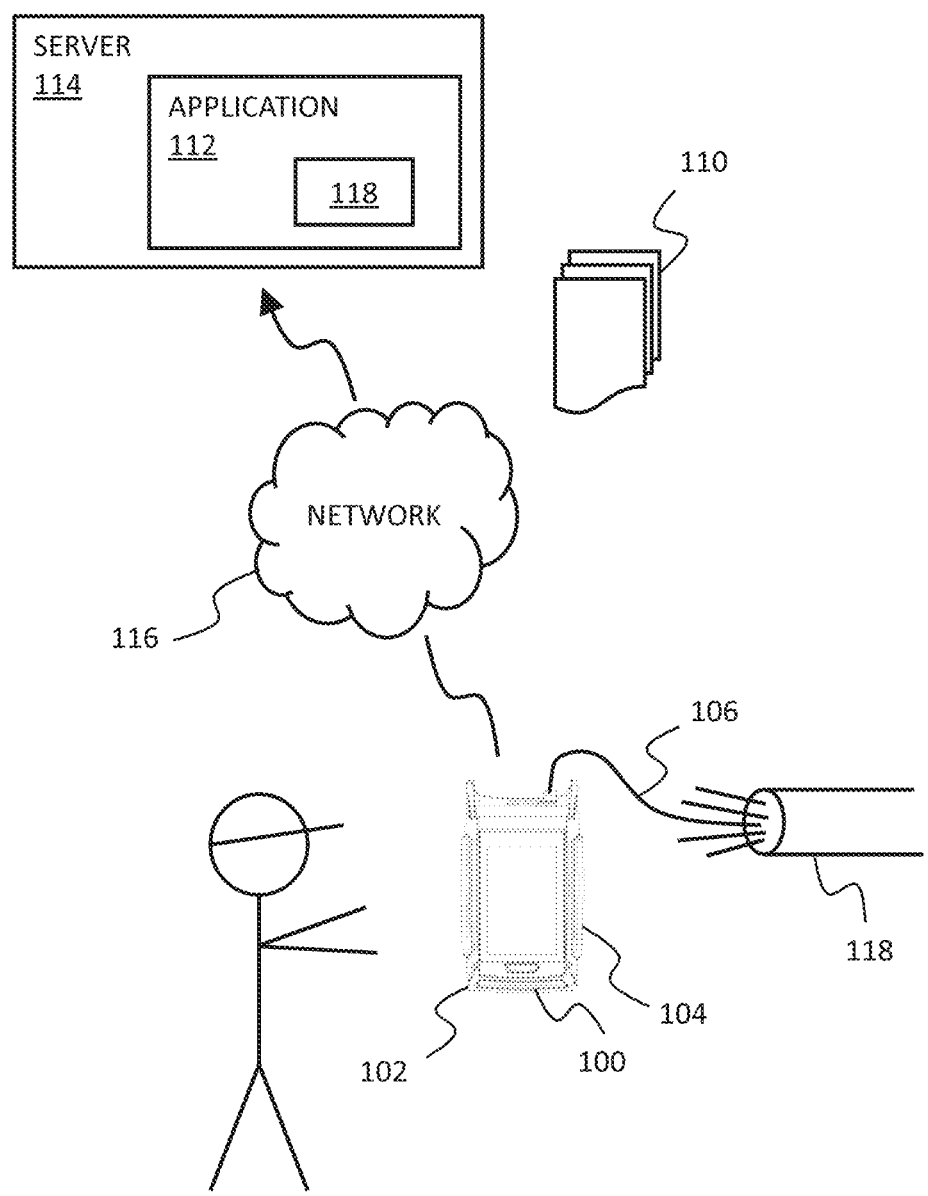
FIG. 1 is a block diagram illustrating a server-based system embodying a duplicate OTDR measurement detection method, in accordance with one embodiment.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiment, aspects need not be limited thereto such that features from one or more exemplary embodiments may be combinable with other features from one or more exemplary embodiments.

DETAILED DESCRIPTION

Optical Time-Domain Reflectometry (OTDR—also used to refer to the corresponding device) is widely employed for characterization of optical fiber links. OTDR is a diagnostic technique where light pulses are launched in an optical fiber link and the returning light, arising from backscattering and reflections along the fiber link, is detected and analyzed. Various "events" along the fiber link can be detected and characterized through a proper analysis of the returning light in the time domain and insertion loss of the fiber link under test, as well as each component along the link, can be characterized.

The acquired power level of the return signal as a function of time is referred to as the OTDR trace (or reflectometric trace), where the time scale is representative of distance between the OTDR acquisition device and a point along the fiber link.

In the following description, techniques that are generally known to ones skilled in the art of OTDR measurement and OTDR trace processing will not be explained or detailed and in this respect, the reader is referred to available literature in the art. Such techniques that are considered to be known include, e.g., signal processing methods for identifying and characterizing events from an OTDR trace. Similarly, an OTDR acquisition device is understood to comprise conventional optical hardware and electronics as known in the art for performing OTDR acquisitions on an optical fiber link.

Each OTDR acquisition is understood to refer to the actions of propagating a test signal comprising one or more test light pulses having the same pulse width in the optical fiber link, and detecting corresponding return light signal from the optical fiber link as a function of time. A test light-pulse signal travelling along the optical fiber link will return towards its point of origin either through (distributed) backscattering or (localized) reflections. The acquired power level of the return light signal as a function of time is referred to as the OTDR trace, where the time scale is representative of distance between the OTDR acquisition device and a point along the optical fiber link. Light acquisitions may be repeated with varied pulse width values to produce a separate OTDR trace for each test pulse width.

One skilled in the art will readily understand that in the context of OTDR methods and systems, each light acquisition generally involves propagating a large number of substantially identical light pulses in the optical fiber link and averaging the results. In this case, the result obtained from averaging will herein be referred to as an OTDR trace. It will also be understood that other factors may need to be controlled during the light acquisitions or from one light acquisition to the next, such as gain settings, pulse power, etc. as is well known to those skilled in the art.

"Backscattering" refers to Rayleigh scattering occurring from the interaction of the travelling light with the optical fiber media all along the fiber link, resulting in a generally sloped background light (in logarithmic units, i.e. dB, on the ordinate) on the OTDR trace, whose intensity disappears at the end of the range of the travelling pulse. "Events" along the fiber will generally result in a more localized drop of the backscattered light on the OTDR trace, which is attributable to a localized loss, and/or in a localized reflection peak. It will be understood that an "event" characterized by the OTDR method described herein may be generated by any perturbation along the fiber link which affects the returning light. Typically, an event may be generated by an optical fiber splice along the fiber link, which is characterized by a localized loss with little or no reflection. Mating connectors can also generate events that typically present reflectance, although these may be impossible to detect in some instances. OTDR methods and systems may also provide for the identification of events such as a fiber breakage, characterized by substantial localized loss and, frequently, a concomitant reflection peak, as well as loss resulting from a bend in the fiber. Finally, any other component along the fiber link may also be manifest as an "event" generating localized loss.

OTDR technology can be implemented in different manners and advanced OTDR technology typically involves multi-pulse acquisitions and analysis whereby the OTDR acquisition device makes use of multiple acquisitions performed with different pulse widths in order to provide different spatial resolutions and noise level conditions for event detection and measurement along the optical fiber link under test and provide a complete mapping of the optical fiber link. As such, an OTDR measurement may comprise multiple OTDR acquisitions performed with different pulse widths or other varying conditions. One or more OTDR traces acquired for a given OTDR measurement are may be saved as part of an OTDR measurement data file or files, and be made available to a duplicate OTDR measurement detection application, which may use one or more of the available OTDR traces to compare the OTDR measurements.

FIG. 1 illustrates a server-based system involved in storing and/or accepting results of a test job executed, e.g., by a network operator worker or a subcontractor worker. The worker employs an OTDR device 100 comprising an OTDR acquisition device 102 to perform OTDR measurements over a plurality of optical fiber links 102, as required by the test job. For each optical fiber link 104 to be tested, the OTDR device 100 produces an OTDR measurement data file 110, which includes one or more OTDR traces that were acquired to characterize the optical fiber link 106. Of course, the OTDR measurement data file 110 may further include parameters of the optical fiber link 102 as derived from the acquired OTDR trace(s) by an OTDR analysis module 104 that may be part of the OTDR device 100. OTDR measurement data files 110 are transferred to a server-based test application 112 that cumulates the OTDR measurement data files 110 and may optionally track the progress and completion of the test job, accept and/or verify OTDR measurement data files 110. The test application 112 may be located in a server 114, which may or may not be cloud-based. The server 114 and the OTDR device 100 communicate over a network 116 such as, e.g. a computer network or the Internet. In some embodiments, a test report is prepared by the worker, e.g., via the OTDR device 100, and transferred to the test application 112 in addition to OTDR measurement data files 110 via the network 116. In other embodiments, a test report is prepared by the test application 112. In the context of installation or repair, the test report may further be required to complete a job and release payment by the network operator to the subcontractor.

In the illustrated case, the test job includes the characterization of many optical fiber links 106 which are part of a same optical fiber cable 108. A plurality of OTDR measurement data files 110 are therefore transferred to the test application 112 and may be attached to the test report.

In the embodiment illustrated in FIG. 1, the test application 112 comprises a duplicate OTDR measurement detection module 118 which is used to detect whether some OTDR measurements that are tagged as being performed over different optical fiber links are likely to have been inadvertently or fraudulently performed over the same optical fiber link. In this case, the duplicate OTDR measurement detection module 118 may be implemented in a test report verification application for example. In other embodiments, the duplicate OTDR measurement detection module 118 may be implemented directly in the OTDR device 100 to prevent mistakes in the field. In yet other embodiments, the duplicate OTDR measurement detection module 118 may be implemented in a test report verification application that is separate from the test application 112 and server 114, such as, e.g., a test report verification application controlled by the network operator and used to check and accept test reports received from subcontractors.

The method that may be embodied by the duplicate OTDR measurement detection module 118 is now described with reference to FIGS. 2 to 7.

Because in many cases, the multiple optical fibers 106 are part of a same optical fiber cable 108, they present similar characteristics of length, total loss and position of connectors and splices. In these cases, comparing these characteristics may therefore not be enough to detect duplicate measurements.

Figure 2:
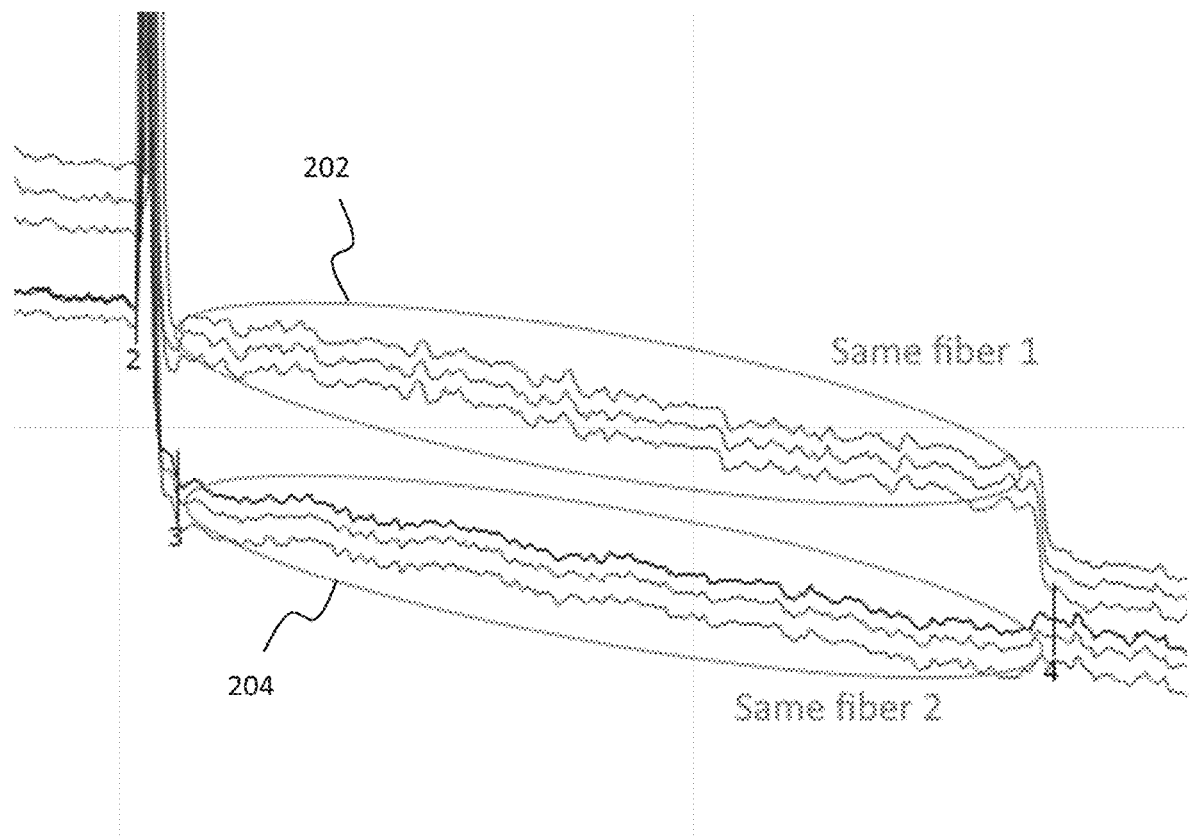
FIG. 2 is a graph comparing multiple OTDR traces obtained with OTDR measurements repeated over the same fiber 1, with OTDR traces obtained with OTDR measurements repeated over another same fiber 2.

FIG. 2 shows a graph illustrating OTDR traces as obtained with OTDR measurements repeated over the same fiber 1, compared with those obtained with OTDR measurements repeated over another same fiber 2.

The manufacturing process of optical fibers produces small fluctuations in the optical fiber structure along any segment of optical fiber. When such fluctuations interact with the OTDR test pulses, it creates interferences and modulations that produce a backscattering pattern in the acquired OTDR trace.

As can be seen in FIG. 2, when OTDR measurements are repeated over the same optical fiber 1, a similar backscattering pattern 202 replicates itself. However, because the structural fluctuations along optical fibers are random, OTDR measurements performed on a different optical fiber 2 show a different backscattering pattern 204. The backscattering pattern can therefore be used to detect duplicate OTDR measurements.

As such, duplicate OTDR measurements can be matched by pair by comparing the acquired OTDR traces, and more specifically, the backscattering pattern associated with a given fiber span along the OTDR traces, which correspond to a continuous optical fiber section where backscattering is typically dominant over reflections and electronic noise.

Figure 3:
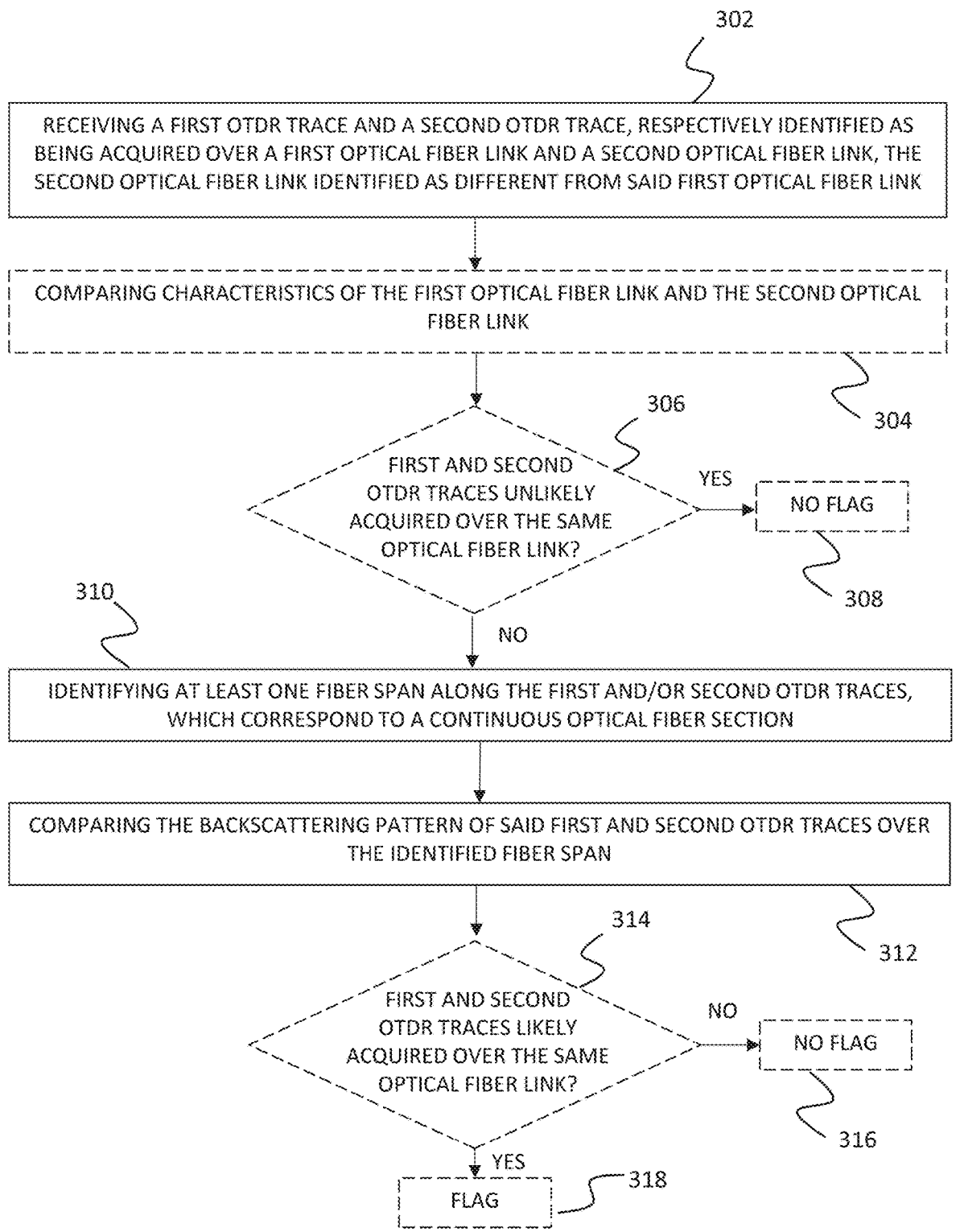
FIG. 3 is a flow chart illustrating a method for detecting duplicate OTDR measurements, in accordance with one embodiment.

FIG. 3 illustrates a method for detecting duplicate OTDR measurements. The method of FIG. 3 may be embodied, e.g., in a duplicate OTDR measurement detection module 118, which may be implemented in a server application, in a processing unit integrated in the OTDR device 100 or in any other test report verification application.

The method comprises step 302 of receiving a first OTDR trace and a second OTDR trace, respectively identified as being acquired over a first optical fiber link and a second optical fiber link, the second optical fiber link identified as different from said first optical fiber link. As explained with reference to FIG. 1, each of the first and second OTDR traces may be received, e.g., as part of an OTDR measurement data file 110 and thereby tagged or indexed as being acquired over a given optical fiber link, for example by a fiber identification number included in the file name or in the OTDR measurement data file 110. In some embodiments, the OTDR measurement data files 110 may be part or associated with a test report in response to a test job.

In step 304, which is optional, characteristics of the optical fiber links as obtained from an OTDR analysis of the OTDR traces are compared. This step may be used to check if the optical fiber links have matching total length, total insertion loss and optionally positions of loss and/or reflective events. If these characteristics do not match, no further step is necessary to determine in step 306 that the first and second OTDR traces are unlikely to have been acquired over the same optical fiber link. Then, in step 308, no flag is activated.

Of course, the match between the compared characteristics of the optical fiber links need not be exact and appropriate tolerance margins should be applied. It is further noted that some low-loss events could be identified on one but not both OTDR measurements. One way to prevent comparison errors in this case is to disregard low-loss events.

Otherwise, in step 310, at least one fiber span along the first and/or second OTDR traces, which correspond to a continuous optical fiber section, is identified. This is the fiber span over which backscattering patterns will be compared. The fiber span may be identified using either the first OTDR trace or the second OTDR trace. Once identified, the same fiber span will be applied to both traces. The fiber span may represent a fiber segment along each optical fiber (e.g. defined in distance) or a data segment along each OTDR traces (e.g. defined by array indexes), along which backscattering patterns will be compared.

The optical fiber section over the identified fiber span is preferably free of loss and reflective events and be long enough for the backscattering pattern to be unique and substantially representative of the optical fiber section over which a comparison is conducted. The minimum suitable length of the fiber span depends upon OTDR acquisition parameters including, e.g., the pulse width and the electronic response. A typical minimum length may be about 100 m for example. A low electronic noise on the backscattering pattern will also help obtaining a more reliable comparison. Ideally, the fiber span is selected such that a ratio of backscattering pattern amplitude to electronic noise over the fiber span is greater than a given threshold.

Figure 4A:
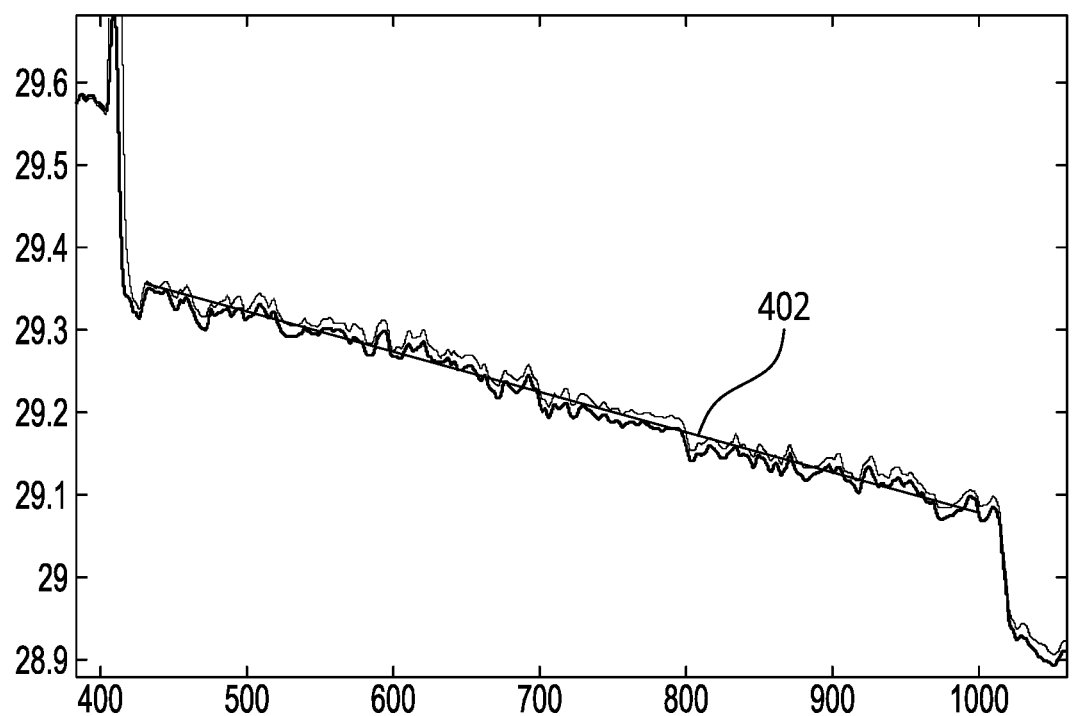
FIG. 4A is a graph showing a backscattering pattern over a fiber span of an optical fiber.
Figure 4B:
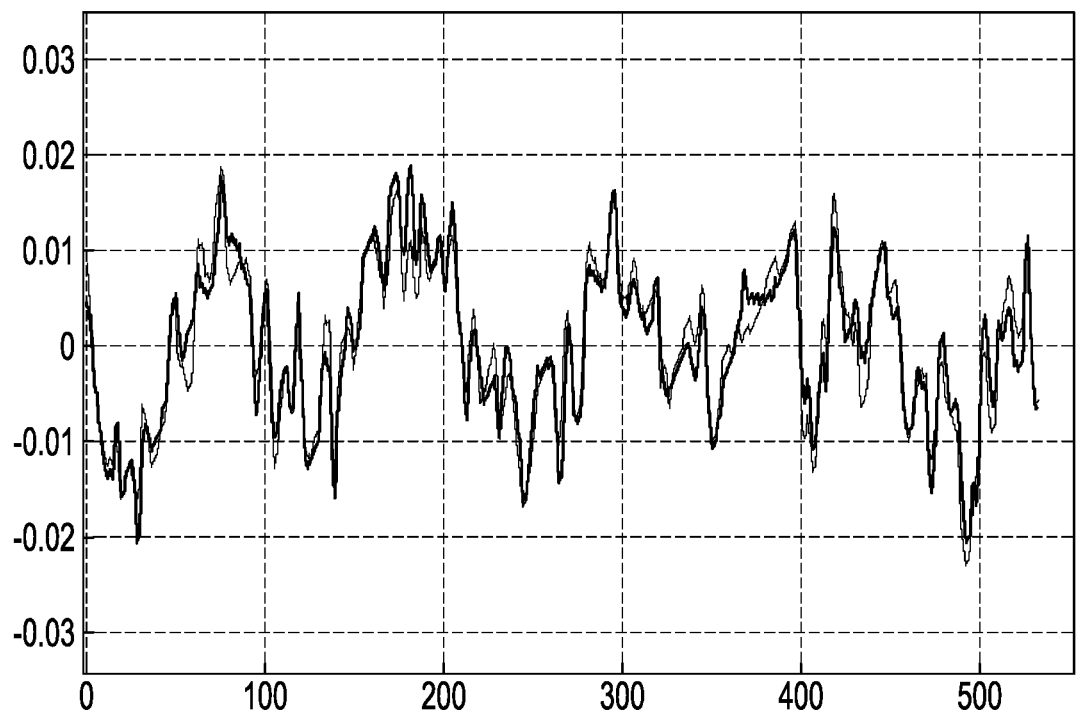
FIG. 4B is a graph showing a backscattering amplitude pattern and illustrating how a backscattering amplitude is derived from the backscattering pattern, in accordance with one embodiment.

The level of electronic noise associated with an OTDR trace is a value that is typically available, or which can be characterized by the OTDR acquisition device for a specific set of OTDR acquisition parameters. As to the backscattering pattern amplitude, as shown in FIGS. 4A and 4B, it can be computed over an identified fiber span by removing the backscattering slope and offset 402 over the fiber span and computing the RMS value of the remaining signal. In one example, the electronic noise will be considered acceptable when the ratio of backscattering pattern amplitude to electronic noise is greater or equal to 10.

There exist different possible implementations for identifying the at least one fiber span over which the backscattering patterns are to be compared. In accordance with one implementation, loss and reflective events are identified along one of the first or the second OTDR trace. One or more of fiber spans between the loss and reflective events are defined. Then, among the one or more defined fiber spans that are longer than a given minimum length, one or more fiber spans having a ratio of backscattering pattern amplitude to electronic noise that is greater than a given threshold are selected. The backscattering pattern is compared over the selected fiber span(s).

Figure 4C:
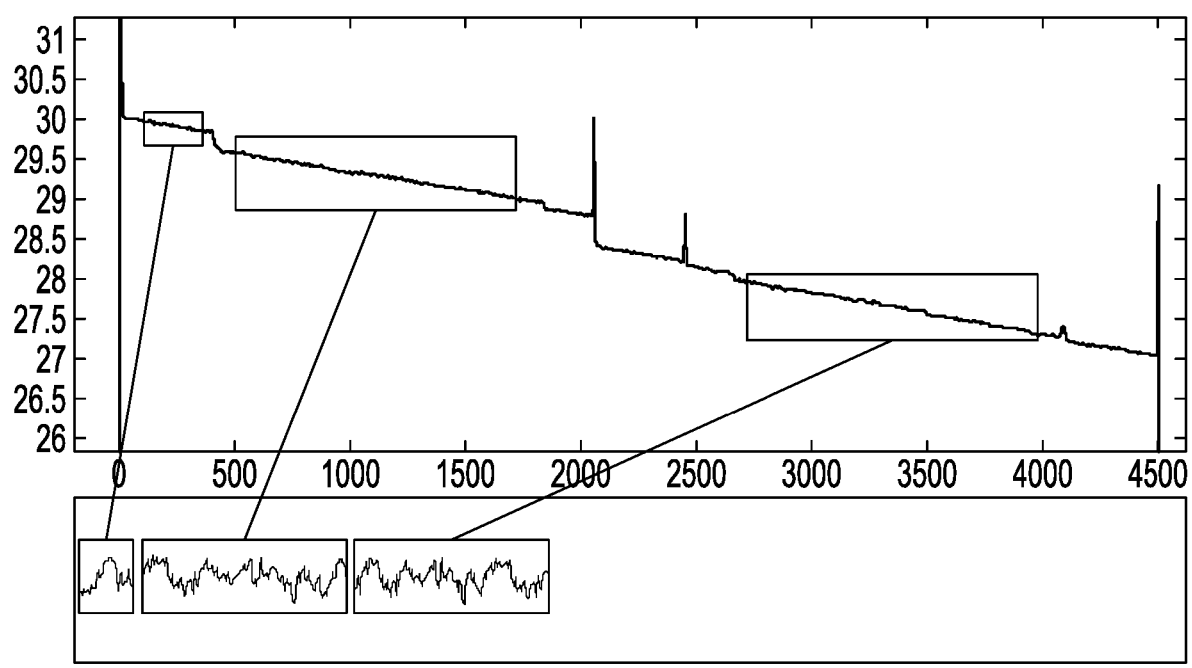
FIG. 4C is a graph showing an OTDR trace and illustrating how backscattering patterns may be concatenated to form a combined backscattering pattern, in accordance with one embodiment.

In one implementation, if more than one fiber span is available for comparison, the backscattering patterns may be compared over the more than one fiber spans. In this case and as illustrated in FIG. 4C, all the fiber spans for which the ratio of backscattering pattern amplitude to electronic noise is above the given threshold may be concatenated to form a combined backscattering pattern on which the comparison is to be performed.

In another implementation, if more than one fiber span is available for comparison, the fiber span having the greatest ratio of backscattering pattern amplitude to electronic noise is selected.

In yet another implementation, among the one or more defined fiber spans, one or more fiber spans having a ratio of backscattering pattern amplitude to electronic noise that is greater than a given threshold are selected. If more than one fiber span is available for comparison, the backscattering patterns may be compared over all fiber spans. And if no fiber span has the ratio of backscattering pattern amplitude to electronic noise greater than the given threshold, the fiber span having the greatest ratio of backscattering pattern amplitude to electronic noise is selected It is noted that the ratio of backscattering pattern amplitude to electronic noise may vary over a long fiber span. Such long fiber spans may therefore be segmented before calculating the ratio of backscattering pattern amplitude to electronic noise. Hence, within one long fiber span some segmented fiber span(s) may be selected for comparison whereas others are put aside. Fiber spans may be segmented in sections of 1 km for example. Of course, fiber spans corresponding to launch and receive fibers should be put aside, since they usually remain the same for each tested optical fiber link within one optical fiber cable.

In step 312, the backscattering patterns of the first and second OTDR traces along the identified fiber span are compared to determine if the first and second OTDR traces that are identified as being acquired over different optical fiber links, are likely to have actually been acquired over the same optical fiber link.

It is noted that a backscattering pattern may be obtained by subtracting the backscattering slope and/or the offset from the OTDR trace over a given fiber span. However, in other embodiments, it may be possible to directly use the OTDR trace over the identified fiber span as the backscattering pattern (including the backscattering slope and offset), depending on the specific calculation being implemented for the backscattering pattern comparison.

In one embodiment, the backscattering patterns are obtained directly from the OTDR trace along the fiber span and are normalized in terms of offset (e.g. the offset is subtracted on both traces). The RMS value of the difference between the backscattering pattern functions is then calculated, whereby lower RMS values indicate a higher degree of similarity and vice versa.

In another embodiment, the backscattering patterns are obtained by removing the backscattering slope and offset from the respective OTDR traces over the fiber span. The backscattering patterns are then compared by calculating a correlation coefficient of the backscattering patterns of the first and the second OTDR traces over the identified fiber span. A value of the correlation coefficient is thereby indicative of a likelihood of the first and the second OTDR traces being acquired over the same optical fiber link.

A correlation coefficient between two functions may be calculated as the mean of the vector products divided by a normalization factor:

$$CorrelationCoefficient = \frac{\text{mean}(\overrightarrow{rfp1} \cdot \overrightarrow{rfp2})}{\sqrt{\text{mean}(\overrightarrow{rfp1} \cdot \overrightarrow{rfp1})} \cdot \sqrt{\text{mean}(\overrightarrow{rfp2} \cdot \overrightarrow{rfp2})}}$$

wherein rfp1 is the backscattering pattern of the first OTDR trace along the fiber span;
and rfp2 is the backscattering pattern of the second OTDR trace along the fiber span.

The absolute value of the resulting correlation coefficient lies between 0 and 1. The closer to 1 is the correlation coefficient, the more similar are the backscattering patterns (a correlation coefficient of −1 would indicate an inverse copy, which is not plausible in this context).

The correlation coefficient is typically lower than 1 because the backscattering patterns fluctuates due to the presence of electronic noise and fluctuations in time of the characteristics of the OTDR test pulses (polarization state, wavelength and/or spectral shape). Despite these limitations, when the ratio of backscattering pattern amplitude to electronic noise is greater than a given threshold of about 10, it is found that a correlation factor greater than about 0.7 indicates that the OTDR traces are very likely to have been acquired on the same optical fiber.

In yet another embodiment, any potential small position offset between two OTDR traces to be compared may be accounted for by calculating a cross-correlation instead of the correlation. The cross correlation will identify the best alignment to reach the greatest correlation coefficient.

In one embodiment, the result of step 312 may simply be output as an indicator of the likeliness of the two OTDR traces to have been acquired over the same optical fiber link.

Otherwise, in step 314, it is determined whether the first and second OTDR traces are likely to have been acquired over the same optical fiber link. In one embodiment, the correlation coefficient is compared to a correlation threshold such that OTDR traces are determined to be likely to have been acquired over the same optical fiber link when a correlation coefficient is greater or equal to the correlation threshold, e.g., 0.5 or 0.7, and unlikely when the correlation coefficient is lower than the correlation threshold.

Then, in step 318, which is optional, a flag associated with the OTDR measurements, the test report or the test job is activated if the first and second OTDR traces that are identified as being acquired over different optical fiber links, are found to be likely to have been acquired over the same optical fiber link. Otherwise, in step 316, no flag is being activated.

The flag may take various forms such as a binary data field in a verification report associated with the digital test report, a text string or a numeric value added to a text test report, an exclamation mark icon or the like in a graphical user interface, a sound alert, etc. For example, in one embodiment, the flag may comprise a binary indicator of a likeliness (active if likely and inactive if unlikely) of the first and second OTDR traces to have been acquired over the same optical fiber link. In another embodiment, the flag may be indicative of a level of likeliness (e.g. low/medium/high or on a scale of 1 to 10) of the first and second OTDR traces to have been acquired over the same optical fiber link.

Comparing OTDR Traces Acquired with Different Pulse Widths or Sampling:

This method is simpler to apply when the two OTDR traces to compare are acquired with the same OTDR conditions, including the same pulse width and the same sampling resolution. However, in practical cases, all OTDR traces may not always be acquired with the same conditions, e.g., if the OTDR device has an automatic OTDR condition selection mode in single pulse width and multi-pulsewidth acquisitions. In this case, a preliminary data preparation step may be needed. Using known signal processing techniques, the OTDR trace acquired with the greatest sampling resolution may be resampled to match the sampling resolution of the other. Furthermore, because longer pulses have a smoothing effect on the backscattering pattern, the correlation process may further be improved by filtering the OTDR trace acquired with the smallest pulses to match the response of the larger pulses. In this case, the correlation threshold may optionally be adjusted to account for a correlation penalty induced by different acquisition conditions.

Large Data Sets:

Referring to FIG. 5, the application of the duplicate OTDR measurement detection method to a large data set of OTDR measurements is described. The duplicate OTDR measurement detection method may become even more meaningful for fraud detection when a large number OTDR measurements are evaluated.

Although the method of FIG. 3 is described with reference to two OTDR traces, it will be understood that the method may be repeated to calculate a duplicate likelihood for all possible combinations of OTDR traces. A plurality of flags may be associated to respective pairs or a global flag may be activated when a duplication is determined to be likely in at least a given proportion of OTDR pairs.

FIG. 5 shows a table listing the correlation coefficients derived from OTDR measurements indicated as being performed over a set of 16 different optical fibers indexed from 1 to 16. Highlighted values indicate that a pair of OTDR measurements is found to be likely duplicate. For example, in the example of FIG. 5, 12 fibers out of 16 are determined to be likely duplicate OTDR measurements, i.e. 74%. A global flag would then be activated. For example, a global flag may be activated if this proportion is greater than 2 or 5%.

In one embodiment, a number of different optical fibers that were likely to have been actually tested can be found by building clusters of OTDR measurements that are likely to be have been acquired over the same optical fiber link. For example, the OTDR measurements (and its associated OTDR trace(s)) can be considered in sequence and the duplicate likelihood is determined for the new OTDR measurement against all previously considered OTDR measurements. For each new OTDR measurement being considered, a new cluster may be created if it is not found to be a duplicate of any previously considered OTDR measurement. However, if a likely duplication is found between a new OTDR measurement and at least one of OTDR measurement that is part of a given cluster, the new OTDR measurement is added to the given cluster. This method allows to identify how many different optical fibers were likely tested.

Figure 6:
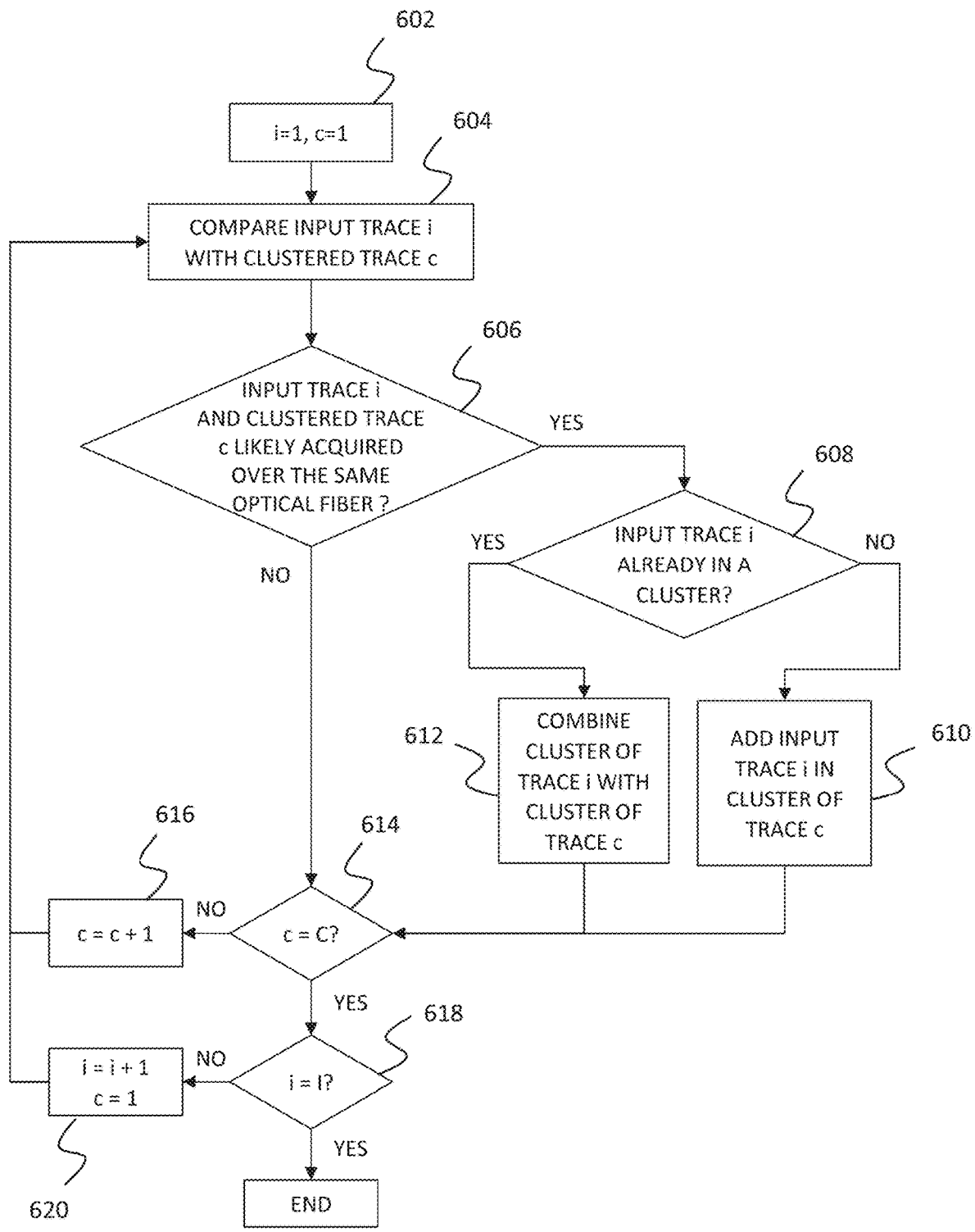
FIG. 6 is a flow chart illustrating a method for building clusters from duplicate OTDR measurements, in accordance with one embodiment.

FIG. 6 illustrates a method for building clusters from duplicate OTDR measurements, in accordance with one embodiment. The method begins in step 602 wherein OTDR measurement i represents a new OTDR measurement to be considered among traces i=1 to I, and OTDR measurement c=1 to C represents previously clustered OTDR measurements. In step 604, new OTDR measurement i is compared to clustered OTDR measurement c, by comparing the correlation coefficient between the OTDR trace i and OTDR trace c. In one embodiment, step 604 may be implemented by applying the method of FIG. 3 (up to step 312) for each pair of OTDR traces. In step 606, it is determined whether OTDR trace i and OTDR trace c are likely to have been acquired over the same optical fiber link. For example, this determination can be done by comparing the computed correlation coefficient for these two traces to a predetermined correlation threshold as in step 314 of the method of FIG. 3.

If, in step 606, OTDR trace i and OTDR trace c are found to be unlikely to have been acquired over the same optical fiber link, then if the last previously clustered trace c is not reached (step 614), the method moves on to the next previously clustered trace c (step 616) and the process is repeated at step 604. If the last previously clustered trace c is reached (step 614), the method moves on to the next input trace i (step 620) and the process is repeated at step 604, until the last input trace is considered (step 618).

If, in step 606, OTDR trace i and OTDR trace c are found to be likely to have been acquired over the same optical fiber link, then if OTDR trace i is not already in a cluster (step 608), it is added to the cluster of OTDR trace c (step 610). If OTDR trace i is already in a cluster, the cluster of OTDR trace i is combined with the cluster of OTDR trace c (step 612).

After step 610 or 612, if the last previously clustered trace c is not reached (step 614), the method moves on to the next previously clustered trace c (step 616) and the process is repeated at step 604. If the last previously clustered trace c is reached (step 614), the method moves on to the next input trace i (step 620) and the process is repeated at step 604, until the last input trace is considered (step 618).

It will be understood that, in software programming, clusters may be built by adding indexes corresponding to OTDR traces/measurements to an array of indexes.

Figure 7:
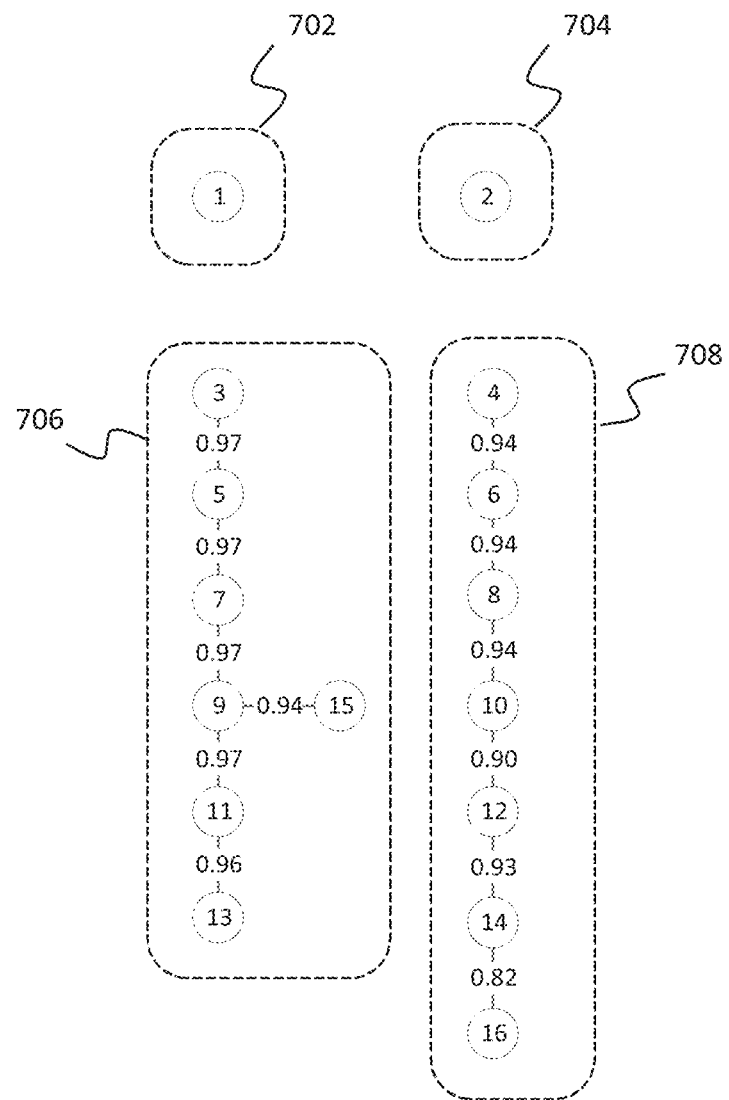
FIG. 7 is a graph illustrating clusters built from the OTDR measurements of the table of FIG. 5.

FIG. 7 illustrates the clustering obtained by applying the method of FIG. 6 to the OTDR measurements of FIG. 5. In the example of FIG. 5, OTDR measurements were not duplicated on optical fibers 1, 2. However, optical fibers 3, 5, 7, 9, 11, 13 and 15 are found to be likely duplicate measurements of the same optical fiber, and optical fibers 4, 6, 8, 10, 12, 14 and 16 to be likely duplicate measurements of another optical fiber. By applying the above clustering method to the data set of FIG. 5, four different clusters (clusters 702, 704, 706 and 708) are created for fibers 1, 2, 3 and 4. Then, when considering the measurement of fiber 5 against that of fiber 3, a correlation coefficient of 0.97 is found. The measurement of fiber 5 is then found to be likely to have been acquired over the same fiber as the measurement of fiber 3 and measurement 5 is added to cluster 706. The same process is repeated until the four different clusters (clusters 702, 704, 706 and 708) are found, which means that only four optical fibers were likely tested.

Because of the fluctuations of the OTDR laser source, the backscattering pattern obtained by repeated measurements over a segment of a same optical fiber may slowly drift in time. This effect gives rise to an additional challenge in case of high fiber count: OTDR measurements that are repeated back-to-back give rise to backscattering patterns that are more likely to be similar, whereas if the OTDR measurements are repeated again and again over the same optical fiber, the backscattering pattern similarly drifts such that some repeated OTDR measurements may be more difficult to identify as duplicates.

In such cases, the above-described clusters may be very helpful to form a daisy chain that links pairs of likely duplicate OTDR measurements. Such a daisy chain may stretch to link all OTDR measurements performed on the same optical fiber, between, e.g., the first and the last, even if the correlation coefficient between these first and last is not indicative of a duplicate. It is then enough that such OTDR measurement be similar to a single OTDR measurement of the cluster for it to be added as a duplicate. In some use cases, this daisy chaining may allow to form a number of clusters of duplicate OTDR measurements that corresponds to the number of different optical fibers that were actually tested.

Example of Computer System Architecture

Figure 8:
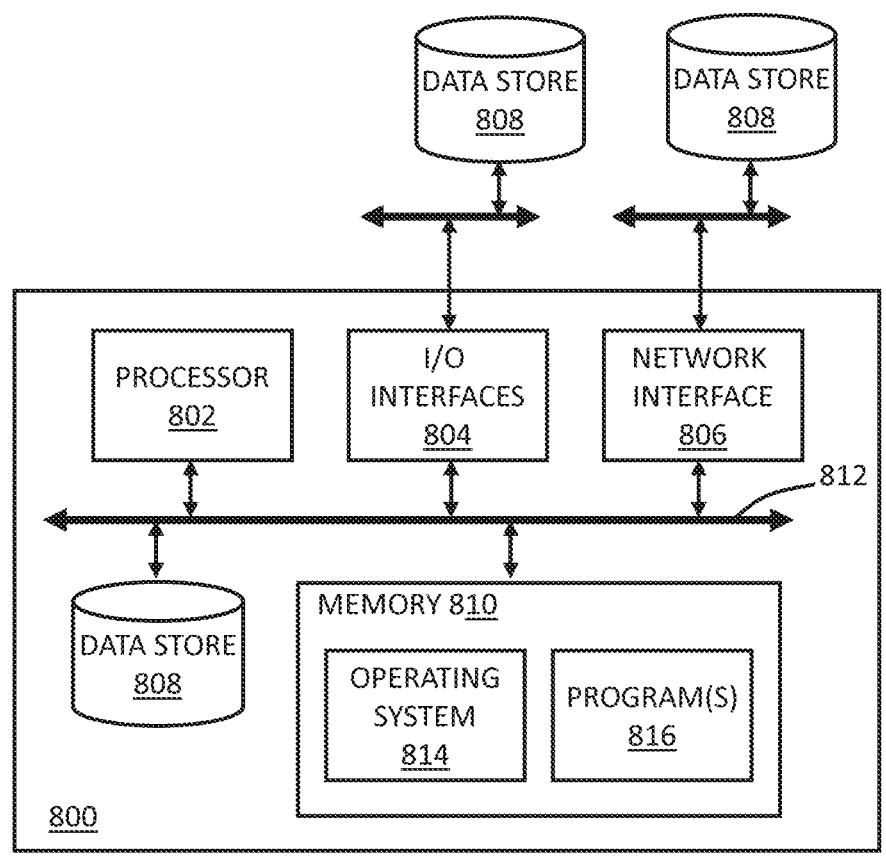
FIG. 8 is a block diagram of a computer system embodying the server used to implement the server-based system of FIG. 1, in accordance with one embodiment.

Much of the software application that is used to implement the herein-described methods resides on and runs on a computer system, which in one embodiment, is a personal computer, workstation, or server. FIG. 8 is a block diagram of a computer system 800 which may embody, e.g., the server 114 used to implement the server-based system of FIG. 1. In terms of hardware architecture, the computer system 800 generally includes a processor 802, input/output (I/O) interfaces 804, a network interface 806, a data store 808, and memory 810. It should be appreciated by those of ordinary skill in the art that FIG. 8 depicts the computer system 800 in a simplified manner, and a practical embodiment may include additional components and suitably configured processing logic to support known or conventional operating features that are not described in detail herein. A local interface 812 interconnects the major components. The local interface 812 may be, for example, but not limited to, one or more buses or other wired or wireless connections, as is known in the art. The local interface 812 may have additional elements, which are omitted for simplicity, such as controllers, buffers (caches), drivers, repeaters, and receivers, among many others, to enable communications. Further, the local interface 812 may include address, control, and/or data connections to enable appropriate communications among the aforementioned components.

The computer system 800 is controlled by the processor 802, which serves as the central processing unit (CPU) for the system. The processor 802 is a hardware device for executing software instructions. The processor 802 may comprise one or more processors, including central processing unit(s) (CPU), auxiliary processor(s) or generally any device for executing software instructions. When the computer system 800 is in operation, the processor 802 is configured to execute software stored within the memory 810, to communicate data to and from the memory 810, and to generally control operations of the computer system 800 pursuant to the software instructions. The I/O interfaces 804 may be used to receive user input from and/or for providing system output to one or more devices or components. The user input may be provided via, for example, a keyboard, touchpad, and/or a mouse. System output may be provided via a display device and a printer (not shown). I/O interfaces 804 may include, for example, a serial port, a parallel port, a Small Computer System Interface (SCSI), a Serial ATA (SATA), a fibre channel, Infiniband, iSCSI, a PCI Express interface (PCI-x), an Infrared (IR) interface, a Radio Frequency (RF) interface, a Universal Serial Bus (USB) interface, or the like.

The network interface 806 may be used to enable the computer system 800 to communicate over a computer network or the Internet. The network interface 806 may include, for example, an Ethernet card or adapter or a Wireless Local Area Network (WLAN) card or adapter. The network interface 806 may include address, control, and/or data connections to enable appropriate communications on the network. A data store 808 may be used to store data. The data store 808 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 808 may incorporate electronic, magnetic, optical, and/or other types of storage media. In one example, the data store 808 may be located internal to the computer system 800 such as, for example, an internal hard drive connected to the local interface 812 in the computer system 800. Additionally, in another embodiment, the data store 808 may be located external to the computer system 800 such as, for example, an external hard drive connected to the I/O interfaces 804 (e.g., SCSI or USB connection). In a further embodiment, the data store 808 may be connected to the computer system 800 through a network, such as, for example, a network attached file server.

The memory 810 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 810 may incorporate electronic, magnetic, optical, and/or other types of storage media. Note that the memory 810 may have a distributed architecture, where various components are situated remotely from one another, but can be accessed by the processor 802. The software in memory 810 may include one or more computer programs, each of which includes an ordered listing of executable instructions for implementing logical functions. The software in the memory 810 includes a suitable operating system (O/S) 814 and one or more computer programs 816. The operating system 814 essentially controls the execution of other computer programs, such as the one or more programs 816, and provides scheduling, input-output control, file and data management, memory management, and communication control and related services. The one or more programs 816 may be configured to implement the various processes, algorithms, methods, techniques, etc. described herein, such as duplicate OTDR measurement detection.

It should be noted that the architecture of the computer system as shown in FIG. 8 is meant as an illustrative example only. Numerous types of computer systems are available and can be used to implement the computer system.

Example of OTDR Device Architecture

Figure 9:
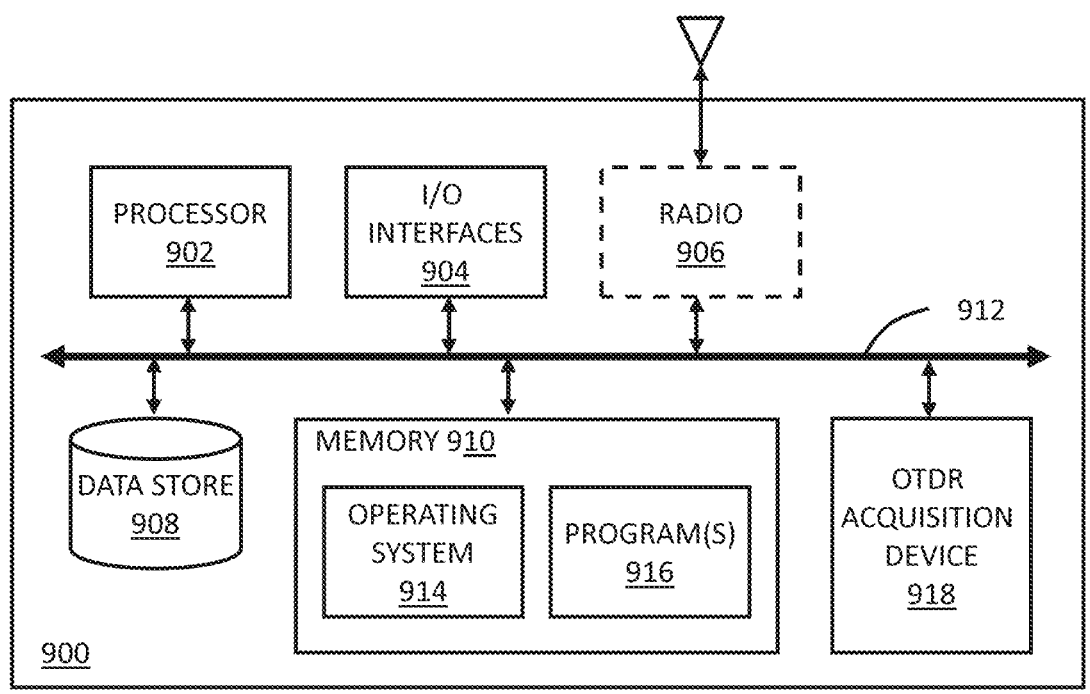
FIG. 9 is a block diagram illustrating an example embodiment of an OTDR device of the system of FIG. 1.

FIG. 9 is a block diagram of an OTDR device 900 which may embody the OTDR device 100 of the system of FIG. 1. The OTDR device 900 can be a digital device that, in terms of hardware architecture, generally includes a processor 902, input/output (I/O) interfaces 904, an optional radio 906, a data store 908, a memory 810 and an OTDR acquisition device. It should be appreciated by those of ordinary skill in the art that FIG. 9 depicts the OTDR device 900 in a simplified manner, and a practical embodiment may include additional components and suitably configured processing logic to support known or conventional operating features that are not described in detail herein. A local interface 912 interconnects the major components. The local interface 912 can be, for example, but not limited to, one or more buses or other wired or wireless connections, as is known in the art. The local interface 912 can have additional elements, which are omitted for simplicity, such as controllers, buffers (caches), drivers, repeaters, and receivers, among many others, to enable communications. Further, the local interface 912 may include address, control, and/or data connections to enable appropriate communications among the aforementioned components.

The processor 902 is a hardware device for executing software instructions. The processor 902 may comprise one or more processors, including central processing units (CPU), auxiliary processor(s) or generally any device for executing software instructions. When the OTDR device 900 is in operation, the processor 902 is configured to execute software stored within the memory 910, to communicate data to and from the memory 910, and to generally control operations of the OTDR device 900 pursuant to the software instructions. In an embodiment, the processor 902 may include an optimized mobile processor such as optimized for power consumption and mobile applications. The I/O interfaces 904 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 904 can include a graphical user interface (GUI) that enables a user to interact with the OTDR device 900.

The radio 906, if included, may enable wireless communication to an external access device or network. Any number of suitable wireless data communication protocols, techniques, or methodologies can be supported by the radio 906, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); magnetic induction; satellite data communication protocols; and any other protocols for wireless communication. The data store 908 may be used to store data, such as OTDR traces and OTDR measurement data files. The data store 908 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 908 may incorporate electronic, magnetic, optical, and/or other types of storage media.

The memory 910 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 910 may incorporate electronic, magnetic, optical, and/or other types of storage media. Note that the memory 910 may have a distributed architecture, where various components are situated remotely from one another, but can be accessed by the processor 902. The software in memory 910 can include one or more computer programs, each of which includes an ordered listing of executable instructions for implementing logical functions. In the example of FIG. 9, the software in the memory 910 includes a suitable operating system (O/S) 914 and computer programs 916. The operating system 914 essentially controls the execution of other computer programs and provides scheduling, input-output control, file and data management, memory management, and communication control and related services. The programs 916 may include various applications, add-ons, etc. configured to provide end-user functionality with the OTDR device 900. For example, example programs 916 may include a web browser to connect with the server 900 for transferring OTDR measurement data files, a dedicated OTDR application configured to control OTDR acquisitions by the OTDR acquisition device 918, set OTDR acquisition parameters, analyze OTDR traces obtained by the OTDR acquisition device 918 and display a GUI related to the OTDR device 900. For example, the dedicated OTDR application may embody an OTDR analysis module configured to analyze acquired OTDR traces in order to characterize the optical fiber link under test, and produce OTDR measurement data files. The dedicated OTDR application may further embody a duplicate OTDR measurement detection module which embodies the duplicate OTDR measurement detection method described herein.

It is noted that, in some embodiments, the I/O interfaces 904 may be provided via a physically distinct mobile device (not shown), such as a handheld computer, a smartphone, a tablet computer, a laptop computer, a wearable computer or the like, e.g., communicatively coupled to the OTDR device 900 via the radio 906. In such cases, at least some of the programs 916 may be located in a memory of such a mobile device, for execution by a processor of the physically distinct device. The mobile may then also include a radio and be used to transfer OTDR measurement data files 114 toward a remote test application residing, e.g., on a server 114.

It should be noted that the OTDR device shown in FIG. 9 is meant as an illustrative example only. Numerous types of computer systems are available and can be used to implement the OTDR device.

Example of OTDR Acquisition Device Architecture

Figure 10:
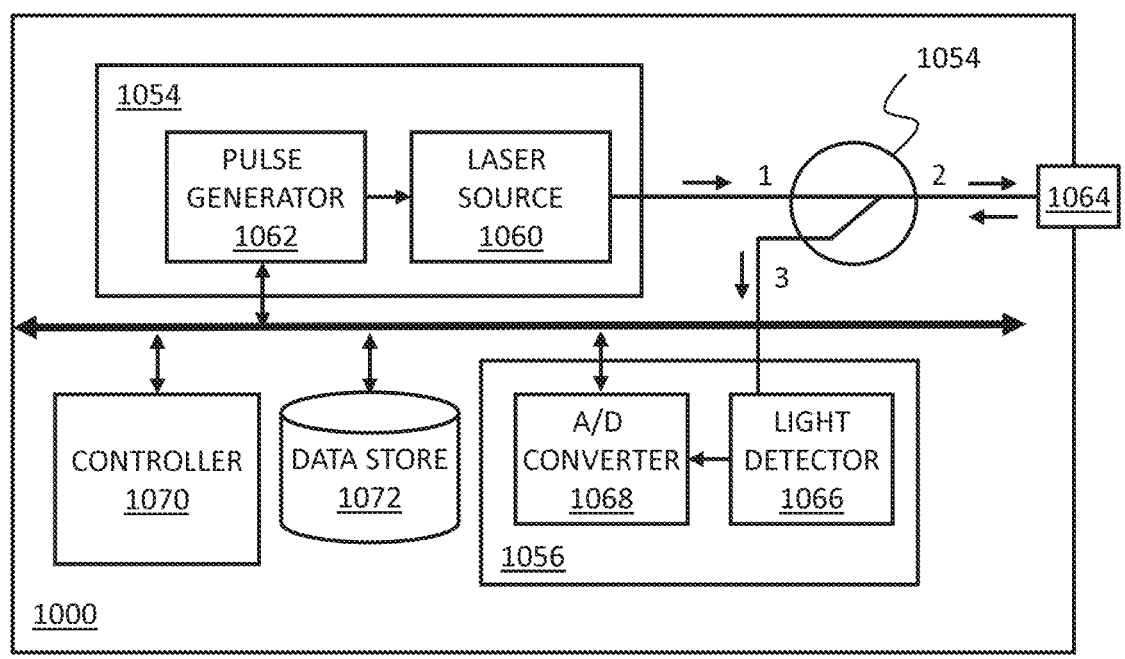
FIG. 10 is a block diagram illustrating an example embodiment of an OTDR acquisition device of the OTDR device of FIG. 9.

FIG. 10 is a block diagram an embodiment of an OTDR acquisition device 1000 which may embody the OTDR acquisition device 918 of the OTDR device 900 of FIG. 9.

The OTDR acquisition device 1000 is connectable toward the tested optical fiber link via an output interface 1064, for performing OTDR acquisitions toward the optical fiber link. The OTDR acquisition device 1000 comprises conventional optical hardware and electronics as known in the art for performing OTDR acquisitions over an optical fiber link.

The OTDR acquisition device 1000 comprises a light generating assembly 1054, a detection assembly 1056, a directional coupler 1058, as well as a controller 1070 and a data store 1072.

The light generating assembly 1054 is embodied by a laser source 1060 driven by a pulse generator 1062 to generate the OTDR test signal comprising test light pulses having desired characteristics. As known in the art, the light generating assembly 1054 is adapted to generate test light pulses of varied pulse widths, repetition periods and optical power through a proper control of the pattern produced by the pulse generator 1062. One skilled in the art will understand that it may be beneficial or required by the application to perform OTDR measurements at various different wavelengths. For this purpose, in some embodiments, the light generating assembly 1054 is adapted to generate test light pulses having varied wavelengths by employing a laser source 1060 that is tunable for example. It will be understood that the light generating assembly 1054 may combine both pulse width and wavelength control capabilities. Of course, different and/or additional components may be provided in the light generating assembly, such as modulators, lenses, mirrors, optical filters, wavelength selectors and the like.

The light generating assembly 1054 is coupled to the output interface 1064 of the OTDR acquisition device 1000 through a directional coupler 1058, such as a circulator, having three or more ports. The first port is connected to the light generating assembly 1054 to receive the test light pulses therefrom. The second port is connected toward the output interface 1064. The third port is connected to the detecting assembly 1056. The connections are such that test light pulses generated by the light generating assembly 1054 are coupled to the output interface 1064 and that the return light signal arising from backscattering and reflections along the optical fiber link 1010 is coupled to the detection assembly 1056.

The detection assembly 1056 comprises a light detector 1066, such as a photodiode, an avalanche photodiode or any other suitable photodetector, which detects the return light signal corresponding to each test light pulse, and an analog to digital converter 1068 to convert the electrical signal proportional to the detected return light signal from analog to digital in order to allow data storage and processing. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace.

Of course, the OTDR acquisition device 1000 may also be used to perform multiple acquisitions with varied pulse widths to obtain a multi-pulsewidth OTDR measurement.

The OTDR acquisition device 1000, and more specifically the light generating assembly 1054 is controlled by the controller 1070. The controller 1070 is a hardware logic device. It may comprise one or more Field Programmable Gate Array (FPGA); one or more Application Specific Integrated Circuits (ASICs) or one or more processors, configured with a state machine or stored program instructions. When the OTDR acquisition device 1000 is in operation, the controller 1070 is configured to control the OTDR measurement process. The controller 1070 controls parameters of the light generating assembly 1054 according to OTDR acquisition parameters that are either provided by the operator of the OTDR software or otherwise determined by program(s) 916.

The data store 1072 may be used to cumulate raw data received from the detection assembly 1056, as well as intermediary averaged results and resulting OTDR traces. The data store 908 may include any of volatile memory elements (e.g., random access memory (RAM, such as DRAM, SRAM, SDRAM, and the like)) or the like and it may be embedded with the controller 1070 or distinct.

The OTDR traces acquired by the OTDR acquisition device 1000 may be received and analyzed by one or more of the computer programs 916 or 816 and/or stored in data store 908 for further processing.

It should be noted that the architecture of the OTDR acquisition device 1000 as shown in FIG. 10 is meant as an illustrative example only. Numerous types of optical and electronic components are available and can be used to implement the OTDR acquisition device.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The embodiments described above are intended to be exemplary only. The scope of the invention is therefore intended to be limited solely by the appended claims.

The invention claimed is:

1. A method for detecting duplicate Optical Time-Domain Reflectometric (OTDR) measurements comprising:
    receiving a first OTDR trace and a second OTDR trace, respectively identified as being acquired over a first optical fiber link and a second optical fiber link, the second optical fiber link identified as different from said first optical fiber link;
    identifying at least one fiber span along the first OTDR trace, which corresponds to a continuous optical fiber section; and
    comparing the backscattering patterns of said first and second OTDR traces over the identified fiber span to determine if said first and second OTDR traces that are identified as being acquired over different optical fiber links, are likely to have been acquired over the same optical fiber link.

2. The method as claimed in claim 1, further comprising: activating a flag associated with the OTDR measurements when said first and second OTDR traces that are identified as being acquired over different optical fiber links, are likely to have been acquired over the same optical fiber link.

3. The method as claimed in claim 1, wherein the step of comparing the backscattering pattern comprises: calculating a correlation coefficient of the backscattering patterns of said first and said second OTDR traces over the identified fiber span, a value of the correlation coefficient being indicative of a likelihood of said first and said second OTDR traces being acquired over the same optical fiber link.

4. The method as claimed in claim 3, further comprising: activating a flag associated with the OTDR measurements when a value of said correlation coefficient is greater than a threshold.

5. The method as claimed in claim 1, further comprising: comparing characteristics of said first optical fiber link and said second optical fiber link, said characteristics comprising one or more of: a total length, a total insertion loss and positions of loss and/or reflective events, and wherein if the compared characteristics do not match, determine that said first and second OTDR traces that are identified as being acquired over different optical fiber links, are unlikely to have been acquired over the same optical fiber link.

6. The method as claimed in claim 1, wherein the step of identifying a fiber span comprises:
    identifying at least one fiber span that is free of loss and reflective events and having a ratio of backscattering pattern amplitude to electronic noise that is greater than a given threshold.

7. The method as claimed in claim 6, wherein the step of identifying a fiber span comprises:
    identifying loss and reflective events along the first OTDR trace;
    defining a plurality of fiber spans between said loss and reflective events;
    among said plurality of fiber spans, selecting at least one fiber span having a ratio of backscattering pattern amplitude to electronic noise that is greater than a given threshold.

8. The method as claimed in claim 1, wherein more than one fiber spans corresponding to continuous optical fiber sections are identified, and wherein the backscattering patterns are compared over the more than one fiber spans.

9. The method as claimed in claim 1, wherein the step of identifying a fiber span comprises:
- identifying loss and reflective events along the first OTDR trace;
- defining a plurality of fiber spans between said loss and reflective events;
- among said plurality of fiber spans, selecting the fiber span having the greatest ratio of backscattering pattern amplitude to electronic noise.

10. The method as claimed in claim 1, wherein the method is applied to a set of more than two OTDR measurements, the method further comprising: calculating a duplicate likelihood for all possible combinations of OTDR measurements and generating a flag associated with the set of OTDR measurements when said duplicate OTDR measurements are detected in at least a given proportion.

11. The method as claimed in claim 10, wherein the method further comprises building a cluster of OTDR measurements that are likely to be have been acquired over the same optical fiber link by:
- for each new OTDR measurement being considered, if duplication is likely between the new OTDR measurement and at least one of the OTDR measurements that are part of said cluster, adding the new OTDR trace to said cluster.

12. A non-transitory computer-readable storage medium comprising instructions that, when executed, cause a processor to perform the steps of:
- receiving a first OTDR trace identified as being acquired over a first optical fiber link, and a second OTDR trace identified as being acquired over a second optical fiber link, identified as different from said first optical fiber link;
- identifying at least one fiber span along the first OTDR trace, which correspond to a continuous optical fiber section; and
- comparing the backscattering pattern of said first and second OTDR traces over the identified fiber span to determine if said first and second OTDR traces that are identified as being acquired over different optical fiber links, are likely to have been acquired over the same optical fiber link.

13. The non-transitory computer-readable storage medium as claimed in claim 12, further comprising instructions that, when executed, cause a processor to perform the steps of: activating a flag associated with the OTDR measurements when said first and second OTDR traces that are identified as being acquired over different optical fiber links, are likely to have been acquired over the same optical fiber link.

14. The non-transitory computer-readable storage medium as claimed in claim 12, wherein the step of comparing the backscattering pattern comprises: calculating a correlation coefficient of the backscattering patterns of said first and said second OTDR traces over the identified fiber span, a value of the correlation coefficient being indicative of a likelihood of said first and said second OTDR traces being acquired over the same optical fiber link.

15. The non-transitory computer-readable storage medium as claimed in claim 14, further comprising instructions that, when executed, cause a processor to perform the steps of, further comprising: activating a flag associated with the OTDR measurements when a value of said correlation coefficient is greater than a threshold.

16. The non-transitory computer-readable storage medium as claimed in claim 12, further comprising instructions that, when executed, cause a processor to perform the steps of: comparing characteristics of said first optical fiber link and said second optical fiber link, said characteristics comprising one or more of: a total length, a total insertion loss and positions of loss and/or reflective events, and wherein if the compared characteristics do not match, determine that said first and second OTDR traces that are identified as being acquired over different optical fiber links, are unlikely to have been acquired over the same optical fiber link.

17. The non-transitory computer-readable storage medium as claimed in claim 12, wherein a set of more than two OTDR traces are received and wherein storage medium further comprising instructions that, when executed, cause a processor to perform the steps of: calculating a duplicate likelihood for all possible combinations of OTDR measurements and generating a flag associated with the set of OTDR measurements when said duplicate OTDR measurements are detected in at least a given proportion.

18. A system for detecting duplicate Optical Time-Domain Reflectometric (OTDR) measurements comprising:
- an OTDR acquisition device connectable toward an end of the optical fiber link for performing one or more OTDR acquisitions toward the optical fiber link, wherein each OTDR acquisition is performed by propagating in the optical fiber link under test, a test signal corresponding to a first pulse width and detecting corresponding return light from the optical fiber link so as to obtain an OTDR trace representing backscattered and reflected light as a function of distance in the optical fiber link;
- a processing unit configured for:
  - receiving a first OTDR trace and a second OTDR trace, respectively identified as being acquired over a first optical fiber link and a second optical fiber link, the second optical fiber link identified as different from said first optical fiber link;
  - identifying at least one fiber span along the first OTDR trace, which corresponds to a continuous optical fiber section; and
  - comparing the backscattering patterns of said first and second OTDR traces over the identified fiber span to determine if said first and second OTDR traces that are identified as being acquired over different optical fiber links, are likely to have been acquired over the same optical fiber link.

19. The system as claimed in claim 18, further comprising a server in which the processing unit is located.

20. The system as claimed in claim 19, wherein the processing unit receives a first OTDR measurement data file and a second OTDR measurement data file produced by the OTDR acquisition device, the first and second OTDR measurement data files respectively associated with a first optical fiber link and a second optical fiber link and respectively comprising a first OTDR trace and a second OTDR trace.

21. The system as claimed in claim 18, wherein the processing unit is further configured for:
- activating a flag when said first and second OTDR traces that are identified as being acquired over different optical fiber links, are determined to be likely to have been acquired over the same optical fiber link.

22. The system as claimed in claim 18, wherein the step of comparing the backscattering pattern comprises: calculating a correlation coefficient of the backscattering patterns of said first and said second OTDR traces over the identified fiber span, a value of the correlation coefficient being indicative of a likelihood of said first and said second OTDR traces being acquired over the same optical fiber link.

23. The system as claimed in claim 22, wherein the processing unit is further configured for:
activating a flag associated with the OTDR measurements when a value of said correlation coefficient is greater than a threshold.

24. The system as claimed in claim 18, wherein the processing unit is further configured for comparing characteristics of said first optical fiber link and said second optical fiber link, said characteristics comprising one or more of: a total length, a total insertion loss and positions of loss and/or reflective events, and wherein if the compared characteristics do not match, determine that said first and second OTDR traces that are identified as being acquired over different optical fiber links, are unlikely to have been acquired over the same optical fiber link.

25. The system as claimed in claim 18, wherein a set of more than two OTDR traces are received and wherein the processing unit is further configured for: calculating a duplicate likelihood for all possible combinations of OTDR measurements and generating a flag associated with the set of OTDR measurements when said duplicate OTDR measurements are detected in at least a given proportion.

* * * * *